(12) United States Patent
Hong

(10) Patent No.: US 7,500,304 B2
(45) Date of Patent: *Mar. 10, 2009

(54) PACKING APPARATUS FOR AN AUTOMATED MANUFACTURING SYSTEM OF LITHIUM SECONDARY BATTERY

(75) Inventor: Ji-Jun Hong, Nonsan-si (KR)

(73) Assignee: Kokam Engineering Co., Ltd., Chungcheongnamido (KR)

( * ) Notice: Subject to any disclaimer, the term of this patent is extended or adjusted under 35 U.S.C. 154(b) by 1138 days.

This patent is subject to a terminal disclaimer.

(21) Appl. No.: 10/478,540

(22) PCT Filed: May 17, 2002

(86) PCT No.: PCT/KR02/00934

§ 371 (c)(1),
(2), (4) Date: Nov. 19, 2003

(87) PCT Pub. No.: WO02/095845

PCT Pub. Date: Nov. 28, 2002

(65) Prior Publication Data

US 2004/0168307 A1 Sep. 2, 2004

(30) Foreign Application Priority Data

May 23, 2001 (KR) ................................ 2001-28495

(51) Int. Cl.
*B23P 19/04* (2006.01)
*B32B 39/00* (2006.01)
(52) U.S. Cl. ........................ 29/730; 156/552; 156/564; 156/565
(58) Field of Classification Search ..... 29/623.1–623.5, 29/730–731
See application file for complete search history.

(56) References Cited

U.S. PATENT DOCUMENTS 1,678,319 A 7/1928 Blessing (Continued)

FOREIGN PATENT DOCUMENTS

JP 10261422 9/1998

(Continued)

*Primary Examiner*—Dah-Wei D Yuan
*Assistant Examiner*—Edu E Enin-Okut
(74) *Attorney, Agent, or Firm*—Husch Blackwell Sanders Welsh & Katz

(57) ABSTRACT

An packing apparatus for an automated manufacturing system of a secondary lithium battery is disclosed. The packing apparatus comprises: a frame; a base member which is installed at the frame, and is provided with a receiving rack for receiving a batch of separator both surfaces of which are laminated with positive electrode plates and negative electrode plates in a predetermined pattern; a stopper member installed at the frame to be linearly movable so as to selectively approach one end of the base member for preventing the separator being supplied to the base member from being separated from the receiving rack; a folder member installed at the frame to be linearly movable with respect to the receiving rack so that the folder can press the separator supplied to a receiving space formed by the receiving rack and the stopper member for predetermined duration, and fold the separator so that both side sections of the folded separator can have the shape of "Z", and the positive electrode plates and the negative electrode plates can alternate with each other; and a cutting/taping member for moving the separator folded in the shape of "Z" to a predetermined area, cutting the separator at a non-electrode plate area to which no electrode plate is attached, and taping the folded and cut piece of separator.

6 Claims, 16 Drawing Sheets

U.S. PATENT DOCUMENTS

| | | |
|---|---|---|
| 2,085,079 A | 6/1937 | Broadwell |
| 2,350,238 A | 5/1944 | Knight |
| 3,355,975 A | 12/1967 | Anfuso |
| 3,706,249 A | 12/1972 | Bruckner |
| 3,906,826 A | 9/1975 | Middendorf |
| 4,592,739 A * | 6/1986 | Ogawa ..................... 493/415 |
| 4,750,724 A * | 6/1988 | Herd et al. ............... 270/39.02 |
| 5,667,909 A | 9/1997 | Rodriguez et al. |
| 5,797,306 A | 8/1998 | Kufahl |
| 6,000,139 A | 12/1999 | Chan |
| 7,055,570 B2 * | 6/2006 | Hong ......................... 156/552 |

FOREIGN PATENT DOCUMENTS

| | | |
|---|---|---|
| JP | 10-321259 | 12/1998 |
| JP | 11-102697 | 4/1999 |
| JP | 11260673 A * | 9/1999 |
| WO | WO 00/17950 | 3/2000 |

* cited by examiner

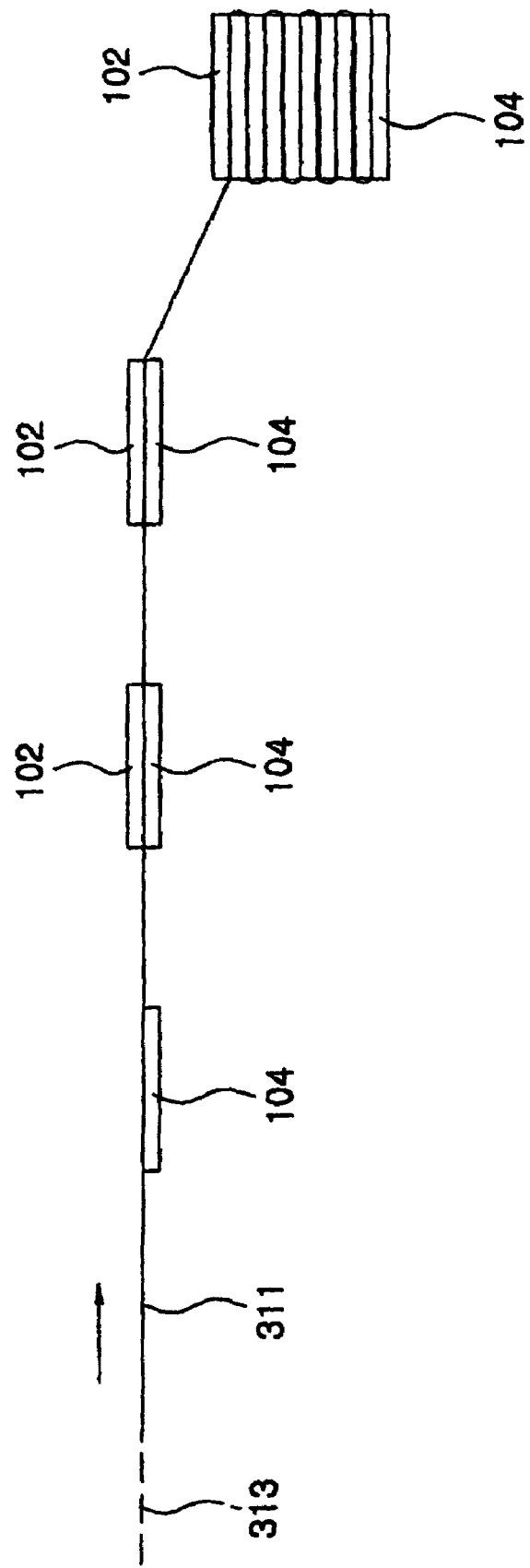

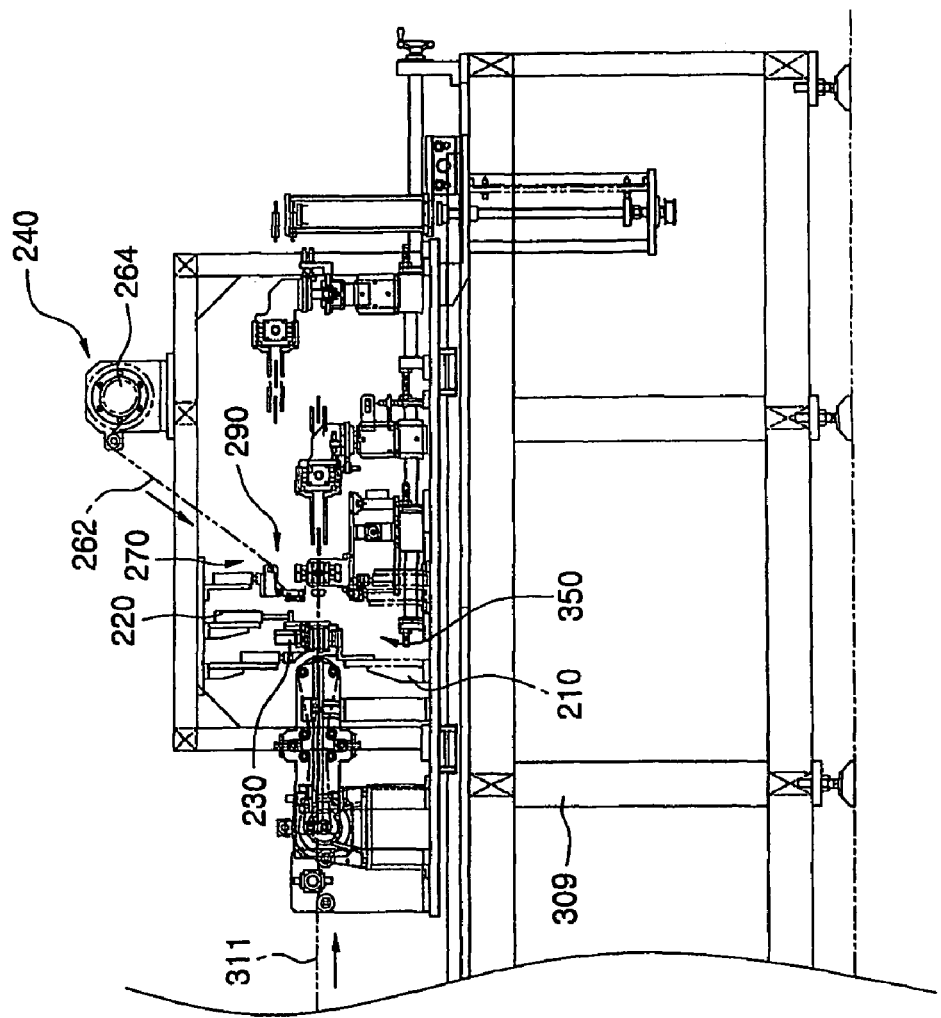

PACKING APPARATUS FOR AN AUTOMATED MANUFACTURING SYSTEM OF LITHIUM SECONDARY BATTERY

BACKGROUND OF THE INVENTION

1. Field of the Invention

The present invention relates to a packing apparatus for an automated manufacturing system of a lithium secondary battery, and more particularly, to a packing apparatus for an automated manufacturing system of a lithium secondary battery capable of packing a crude cell, in which after both surfaces of a predetermined length of separator which is supplied from a roll of separator in the form of film and is arranged to travel along a horizontal path are laminated with a batch of positive electrode plates and negative electrode plates and the laminated separator is folded in a fold/fold fashion, a crude cell can be manufactured in a continuous process line by cutting a laminated piece of separator from the roll of separator and taping the piece of separator.

2. Description of the Related Art

In general, as portable electronic products such as video cameras, portable phones, and portable PCs become lighter, or highly functional, various development and research have been focused on batteries used as power sources of such portable electronic products. Such batteries can be used continuously by recharging the batteries.

Among various batteries, usually, nickel cadmium batteries, nickel hydrogen batteries, nickel zinc batteries, lithium secondary batteries and the like are used as power sources of electronic products, and, in particular, lithium secondary batteries are generally used taking into consideration the use life and capacity thereof.

According to types of electrolyte, the lithium secondary batteries are classified into lithium metal batteries and lithium ion batteries which employ liquid electrolyte, and lithium polymer batteries which employ solid polymer electrolyte. According to types of solid polymer electrolyte, the lithium polymer batteries are classified into full-solid type lithium polymer batteries in which organic electrolytic liquid is not included at all, and lithium ion polymer batteries employing gel type polymer electrolyte containing organic electrolytic liquid.

The lithium secondary battery is manufactured by stacking a plurality of unit cells having a separator-electrode structure so as to meet a required capacity, connecting the unit cells to each other in parallel, and packing the unit cells into a cylindrical or polyhedral can.

However, in a battery in which electrode plates are disposed according to a conventional method, there is a problem in which when the battery is overcharged, a voltage of the battery rises drastically, and the energy of the battery may be instantaneously discharged and the electrolyte may evaporate or burn, and therefore the performance of the battery and safety thereof deteriorate. In addition, there is another problem in which the process of attaching electrode taps for electrically connecting unit cells to each other is very complicated.

SUMMARY OF THE INVENTION

To solve the above-described problems, it is an objective of the present invention to provide a packing apparatus for an automated manufacturing system of a secondary battery having an improved structure capable of automating operations of folding a separator both surfaces of which are laminated with positive electrode plates and negative electrode plates so that both side sections of the separator can have the shape of "Z" (fold/fold fashion), cutting the separator, taping the folded separator, unloading the packed separator, and the like in a continuous process line.

Accordingly, to achieve the above objectives, there is provided a packing apparatus for an automated manufacturing system of a secondary lithium battery comprising: a frame; a base member which is installed at the frame, and is provided with a receiving rack for receiving a batch of separator both surfaces of which are laminated with positive electrode plates and negative electrode plates in a predetermined pattern; a stopper member installed at the frame to be linearly movable so as to selectively approach one end of the base member for preventing the separator being supplied to the base member from being separated from the receiving rack; a folder member installed at the frame to be linearly movable with respect to the receiving rack so that the folder can press the separator supplied to a receiving space formed by the receiving rack and the stopper member for predetermined duration, and fold the separator so that both side sections of the folded separator can have the shape of "Z", and the positive electrode plates and the negative electrode plates can alternate with each other; and a cutting/taping member for moving the separator folded in the shape of "Z" to a predetermined area, cutting the separator at a non-electrode plate area to which no electrode plate is attached, and taping the folded and cut piece of separator.

In the packing apparatus for an automated manufacturing system of a secondary lithium battery, the base member comprises: a guiding jaw projected from a base plate to guide the separator supplied thereto; and a pair of recessed portions recessed into both sides of the receiving rack.

In the packing apparatus for an automated manufacturing system of a secondary lithium battery, the base member further comprises a biasing member installed at the frame for biasing the separator toward the stopper member so that the separator supplied to the receiving rack can be easily folded in the shape of "Z".

In the packing apparatus for an automated manufacturing system of a secondary lithium battery, it is preferable that the stopper member has a stopper fork for blocking both sides of the base member, and is linearly moved by a stopper moving member.

In the packing apparatus for an automated manufacturing system of a secondary lithium battery, the folder member comprises a folder plate moved by a folder cylinder.

In the packing apparatus for an automated manufacturing system of a secondary lithium battery, the cutting/taping member comprises: a pair of clamp members for approaching both sides of the base member, clamping both sides of a piece of separator folded in the shape of "Z", and moving the piece of separator horizontally to a taping position; a cutting member installed at the frame to be movable for cutting the separator at the leading end of the base member after the separator has been moved by the clamp member; a tape supplying member installed at the frame to attach one end of tape to the piece of separator after a tape roller around which the tape is wound is moved along a tape travel path; clamp rotating members installed at the frame for rotating the clamp members predetermined times so that the piece of separator can be taped while the piece of separator to which one end of the tape is attached is rotated at both ends thereof; and a tape cutting member installed at the tape supplying member to be movable for cutting the loose end portion of the tape extended from the packed piece of separator which has been rotated by the clamp rotating members and has been packed with the tape.

In the packing apparatus for an automated manufacturing system of a secondary lithium battery, the cutting/taping member further comprises a holder member installed at the frame to be raised and lowered so that the holder member can approach the tape supplying member and contact one surface of the separator to prevent the separator from fluttering before the separator is cut by the cutting member.

BRIEF DESCRIPTION OF THE DRAWINGS

The above objective and advantages of the present invention will become more apparent by describing in detail preferred embodiments thereof with reference to the attached drawings in which:

FIG. 2 is a front view illustrating an example in which the separator strip is folded in the shape of "Z" by the lamination unit shown in FIG. 1;

FIGS. 3A and 3B are front and plan views of a packing apparatus shown in FIG. 1;

DETAILED DESCRIPTION OF THE INVENTION

Now, a packing apparatus for an automated manufacturing system of a lithium secondary battery according to a preferred embodiment of the present invention will be described in detail with reference to the attached drawings.

Figure 1:
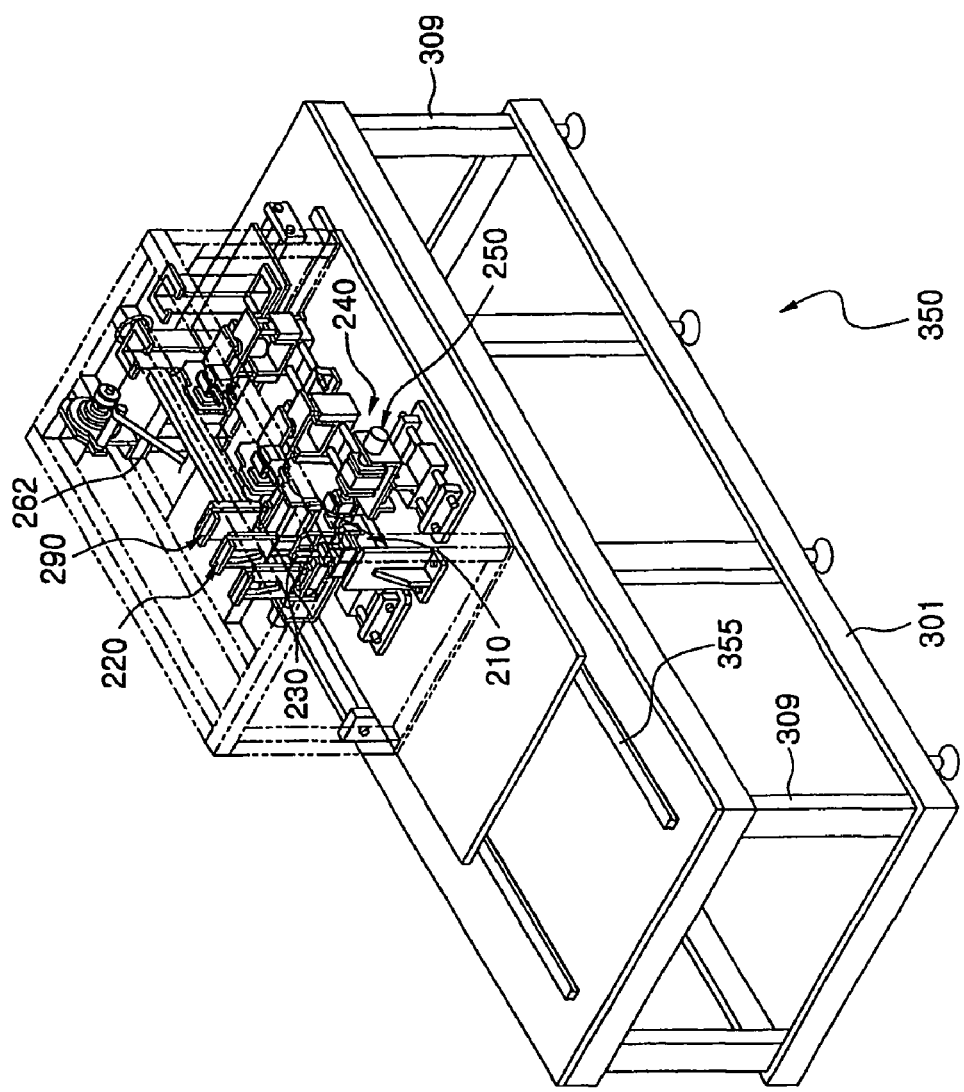
FIG. 1 is a schematic perspective view illustrating a packing apparatus for an automated manufacturing system of a lithium secondary battery according to a preferred embodiment of the present invention.

Referring to FIG. 1, a packing apparatus 350 according to the present invention is intended to fold the separator 311 supplied through the leading end of the transporting unit (not shown), after the separator 311 is laminated with the positive and negative electrode plates 102 and 104 by the lamination unit (not shown), so that the section of the separator 311 can have the shape of "Z", that is fold/fold fashion, as shown in FIG. 2, and to tape the folded separator 311 with a tape.

Figure 3B:
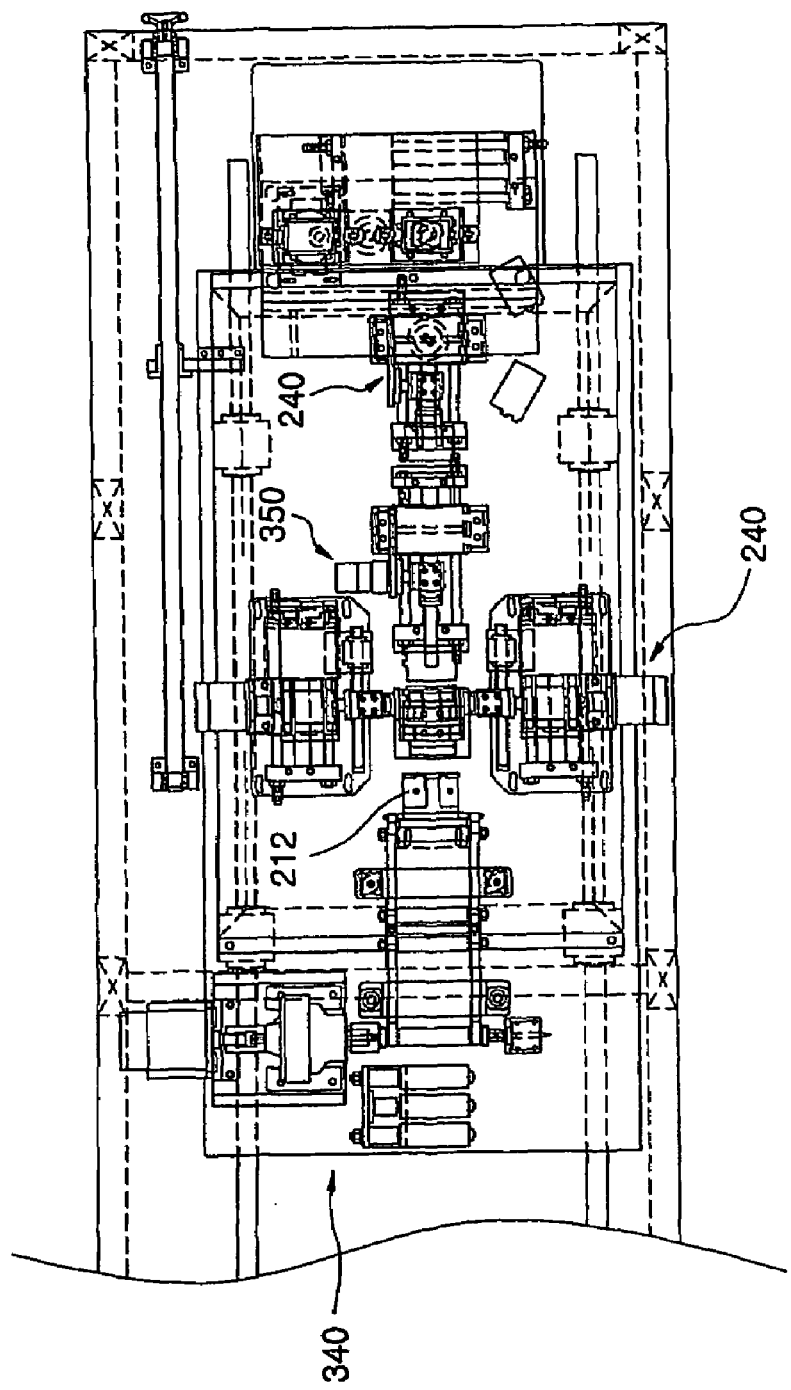

FIGS. 3A and 3B are front and plan views of the packing apparatus shown in FIG. 1.

Referring to FIG. 1 and FIGS. 3A and 3B, the packing apparatus 350 comprises a frame 301, a base member 210 to which one batch of the separator 311 both surfaces of which have been laminated with a plurality of positive and negative electrode plates 102 and 104 in a predetermined pattern is supplied, and in which the one batch of the separator 311 is received, a stopper member 220 installed at the frame 301 to be raised and lowered so that the separator 311 received in the base member 210 can be prevented from being separated from the receiving rack 212, a folder member 230 continuously reciprocating to fold the separator 311 supplied to a receiving space 214 formed by the receiving rack 212 and the stopper member 220 so that the section of the separator 311 can have the shape of "Z", a cutting/taping member 240 for moving the separator 311 folded in the shape of "Z" to a predetermined taping position, for cutting a non-electrode-plate area of the separator 311 to which any electrode plate is not attached, and for taping the cut separator 311.

The frame 301 may be divided into a lower frame at which a plurality of supporting pillars 309 for supporting the packing apparatus 350 apart from the floor are installed, and an upper frame on which components of the apparatus 350 are seated. Various driving motors, a vacuum system, an air system, an electronic system, an adhesive supplying system, and the like are provided at the lower frame. It is preferable that the upper surface of the upper frame is arranged to be in an accurately horizontal state.

Figure 4A:
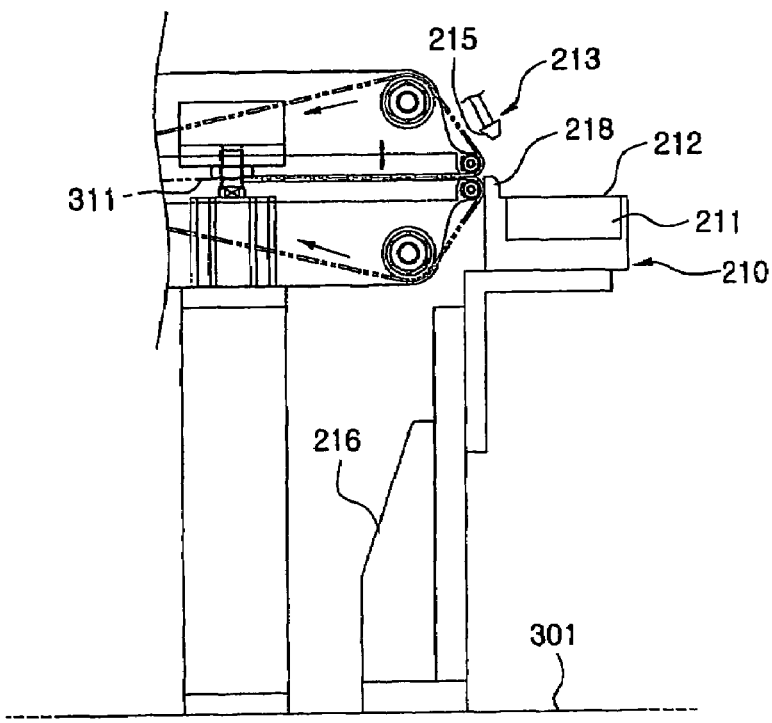
FIGS. 4A and 4B are expanded front and plan views of a base member portion shown in FIG. 3.
Figure 4B:
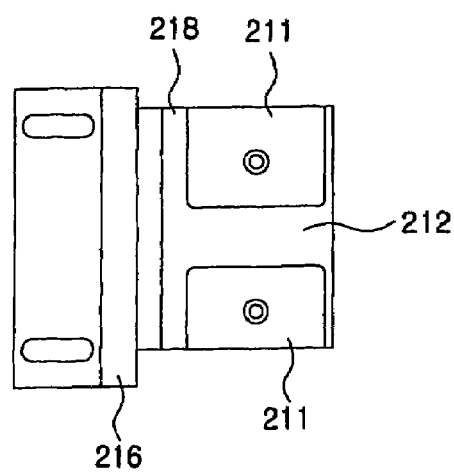

FIGS. 4A and 4B are expanded front and plan views of the portion of the base member of the packing apparatus.

Referring to FIGS. 4A and 4B, the base member 210 comprises a receiving rack 212 which has a planar shape and is installed at the base plate 216 installed at the frame 301, a guiding jaw 218 projected from the base plate 216 for guiding the supplied separator 311 toward the receiving rack 212, and a pair of recessed portions 211 recessed into both sides of the receiving rack 212. It is preferable that the upper surface of the guiding jaw 218 is disposed to be parallel to the travel path 313 and is specially surface-treated. The recessed portion 211 is a space into which a finger member 245 (FIGS. 6A and 6B) of the cutting/taping member 240 is inserted.

In addition, the base member 210 further comprises a biasing member 213 for biasing the separator 311 toward the direction opposite to the separator supplied direction, that is, toward the stopper member 220 so that the separator 311 supplied to the receiving rack 212 can be easily folded to be almost the shape of "Z". It is preferable that the biasing member 213 comprises an air nozzle 215 capable of pushing the separator 311 fluttering due to air blowing force toward the stopper member 220.

Figure 5A:
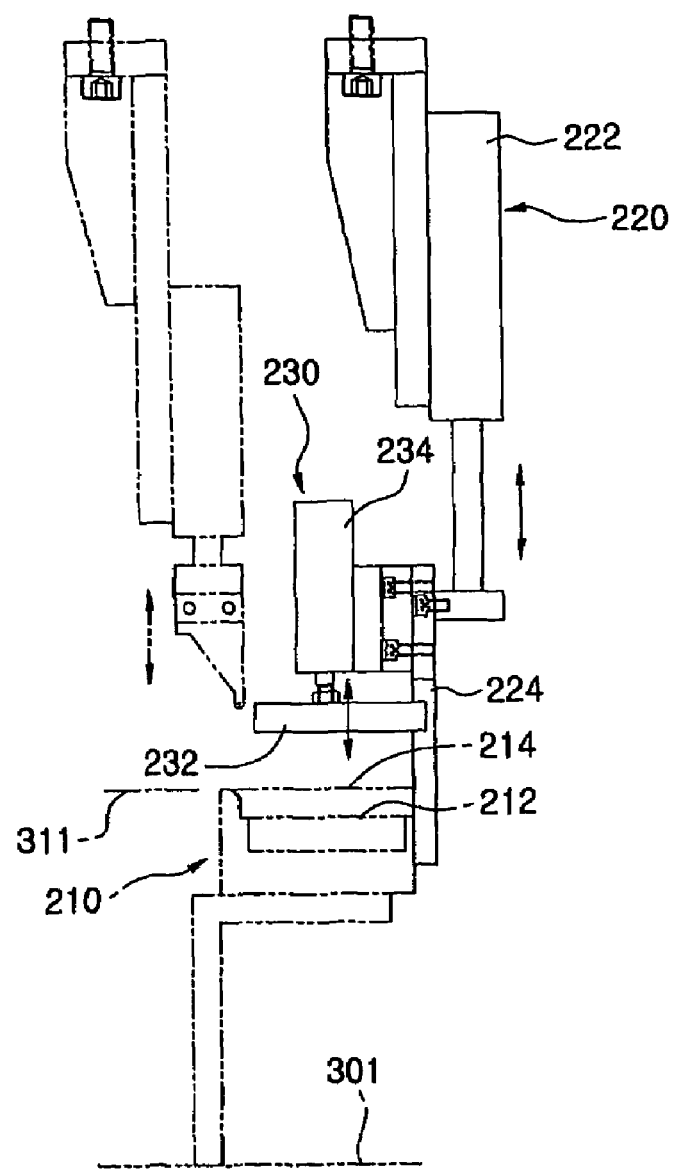
FIGS. 5A and 5B are front and right side views of a stopper member and a folder member shown in FIG. 3, respectively.
Figure 5B:
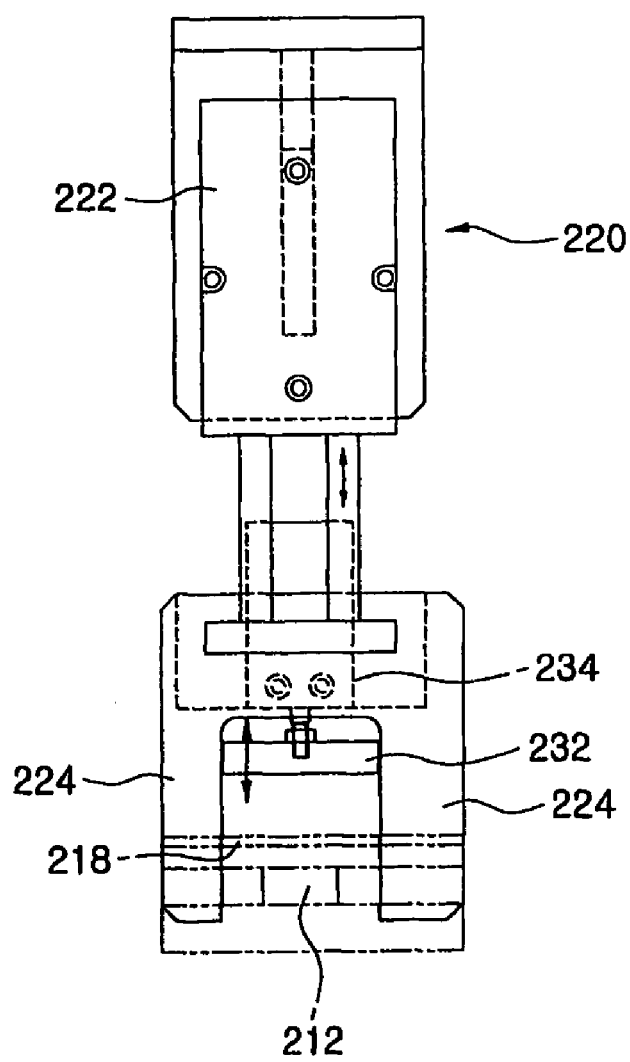

FIGS. 5A and 5B are front and right side views of the stopper member and the folder member shown in FIG. 1.

Referring to FIGS. 5A and 5B, the stopper member 220 is installed to be capable of being moved linearly back and forth with respect to the frame 301 by a stopper moving member 222 which is installed at the frame 301 and is controlled by the control unit so that the stopper member 220 can block selectively a side of the base member 210 to form the receiving space 214 and prevent the separator 311 supplied to the receiving rack 212 from being separated from the receiving rack 212. It is preferable that the stopper member 220 has two stopper forks 224 at its one end, and a vacant space is formed between the two stopper forks 224.

The folder member 230 is intended to continuously press and fold the separator 311 supplied to the receiving space 214 and biased toward the stopper member 220 so that the sections of the separator 311 at both side portions of the positive electrode plates 102 and the negative electrode plates 104 can have the shape of "z", and to cause the positive electrode plates 102 and the negative electrode plates 104 alternate with each other. The folder member 230 comprises a folder plate 232 disposed to be raised or lowered at a position corresponding to the receiving space 214, and a folder cylinder 234 which is installed at the stopper member 220 and controlled by the control unit. Therefore, during packing of a batch of the separator 311, while the stopper member 220 moves back and forth once, the folder plate 232 moves back and forth as many times as the number of electrode plates required for a battery, that is, the number of the positive electrode plates and the negative electrode plates which alternate with each other.

Figure 6A:
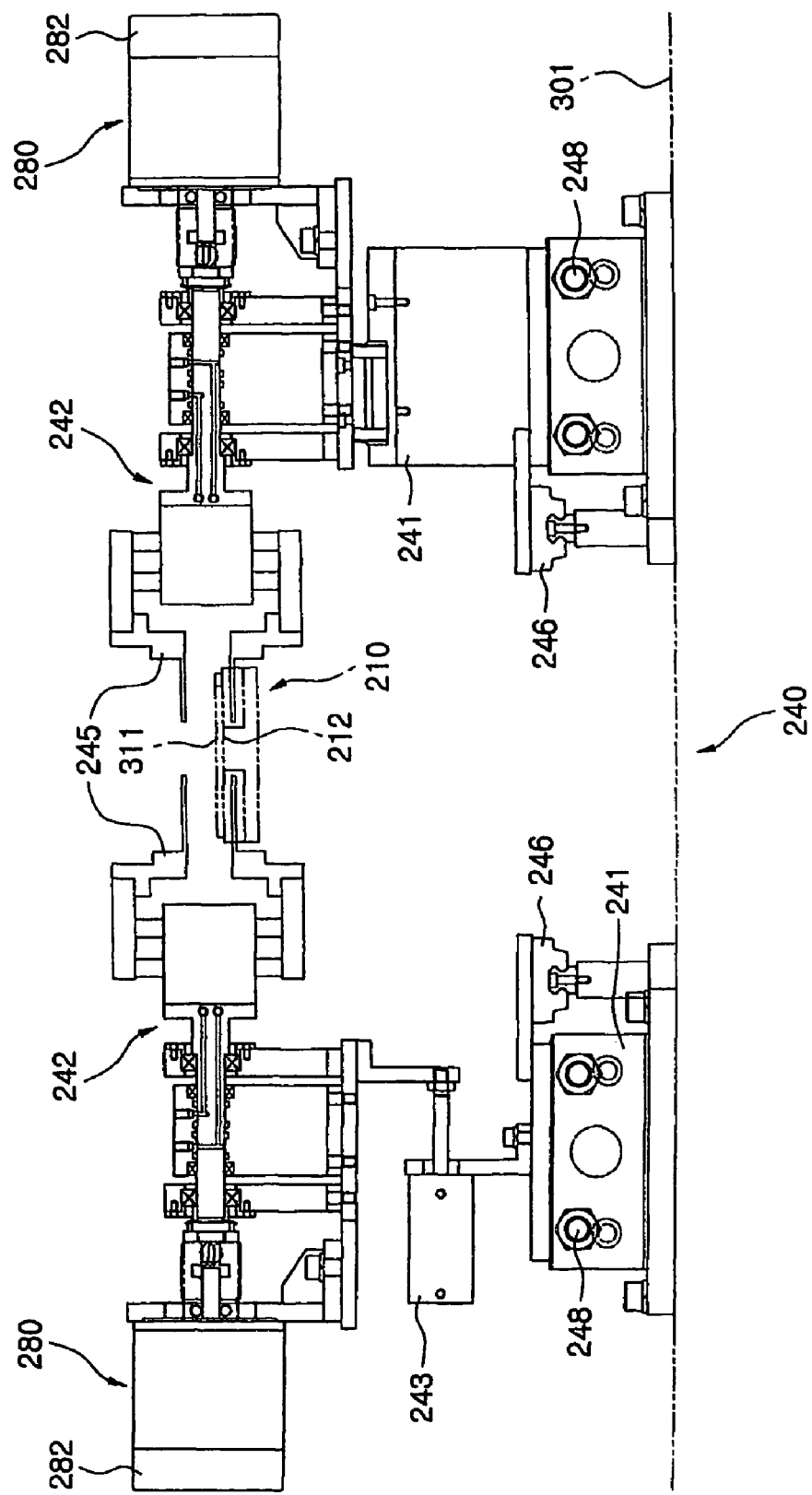
FIGS. 6A and 6B are front and right side views of a clamp member portion shown in FIG. 3.
Figure 6B:
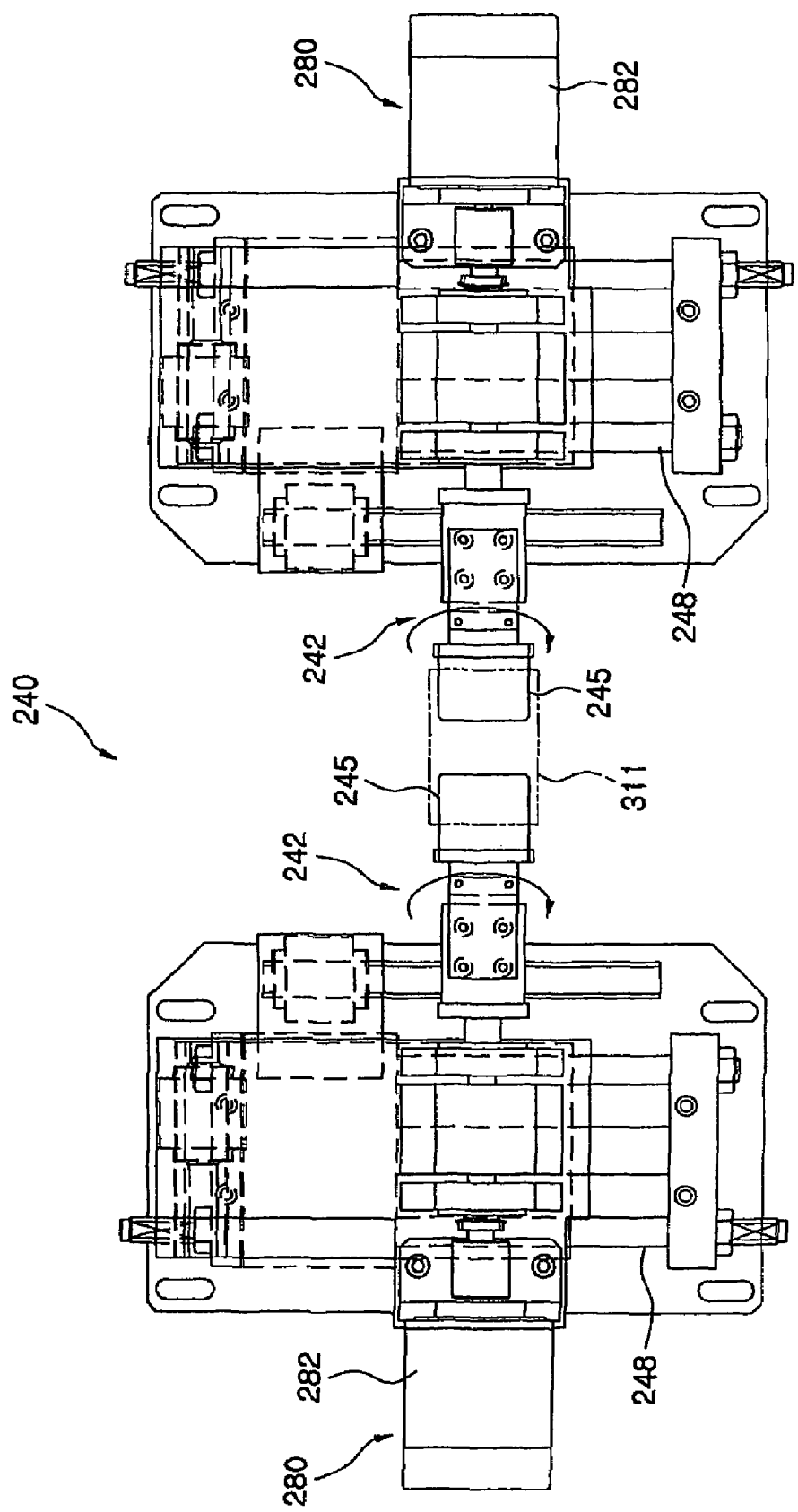

Referring to FIGS. 6A and 6B, the cutting/taping member 240 comprises a pair of clamp members 242 which approach both sides of the base member 210, clamp both sides of a piece of separator which is folded in the shape of "z", and are moved horizontally to a taping position, a cutting member 250 (FIGS. 7A and 7B) installed at the frame 301 to be movable for cutting the separator 311 from above the base member 210 after the piece of separator 311 is moved by the clamp members 242, a tape supplying member 270 (FIG. 1 and FIG. 3) installed at the frame 301 so as to attach one end of a tape 262 to a piece of separator 311 after a tape roller 264 around which the tape 262 is wound is moved to the taping position through a tape travel path, clamp rotating members 280 (FIGS. 6A and 6B) installed at the frame 301 for rotating the clamp members 242 predetermined times so that the piece of separator can be taped while the piece of separator to which one end of the tape 262 is attached is rotated at both ends thereof, a tape cutting member 290 (FIG. 3A) installed at the frame 301 to be movable for cutting the loose end portion of the tape 262 extended from the packed piece of separator 311 which has been rotated by the clamp rotating members 280 and has been packed with the tape 262, and a holder member 244 installed at the frame 301 to be raised and lowered so that the holder member 244 can approach the tape supplying member 270 and contact the lower surface of the separator 311 to prevent the separator 311 from fluttering before the separator 311 is cut by the cutting member 250.

Referring to FIGS. 6A and 6B, the pair of clamp members 242 are installed to be symmetrical with respect to the travel path of the separator 311 and to be parallel to the frame 301. Each clamp member 242 comprises a movable block 241 which is moved back and forth between the base member 210 and the taping position along an LM guide 246 and guide rails 248 which are parallel to the travel path of the separator 311, and a pair of finger members 245 installed at the movable block 241 so as to clamp the piece of separator 311 while being positioned at the recessed portion 211 and being operated by an air cylinder 243.

Figure 7A:
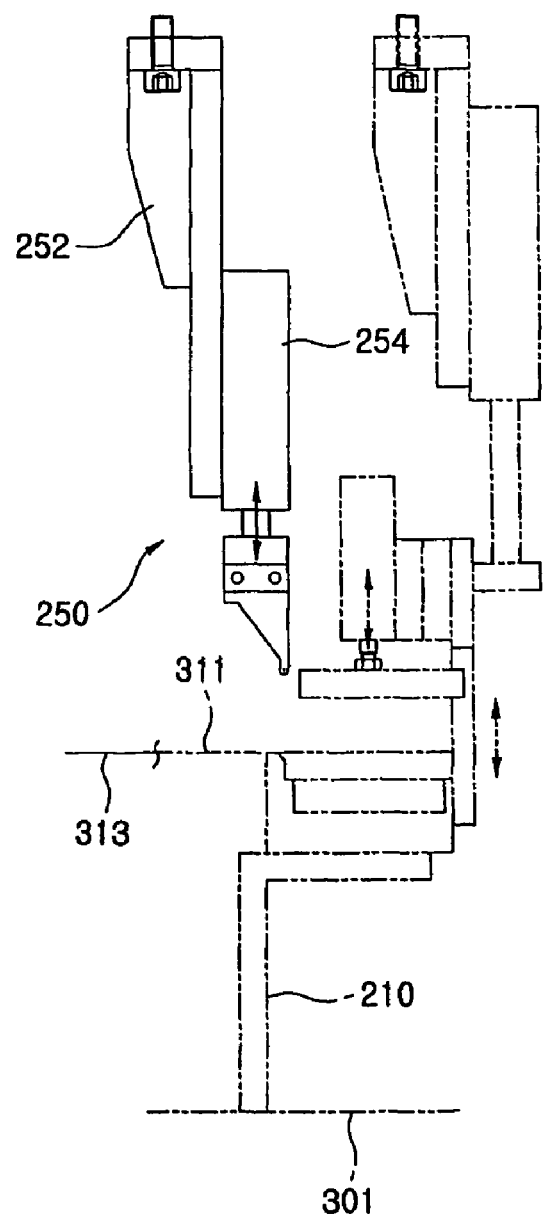
FIGS. 7A and 7B are front and right side views of a cutting member portion shown in FIG. 3.
Figure 7B:
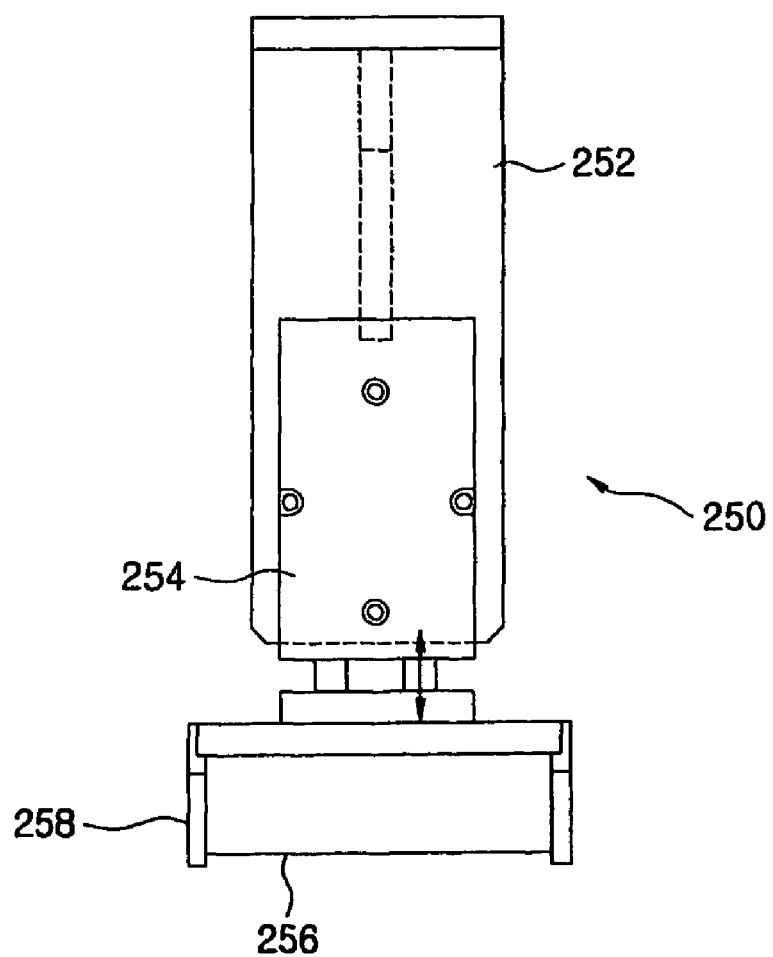
Figure 8A:
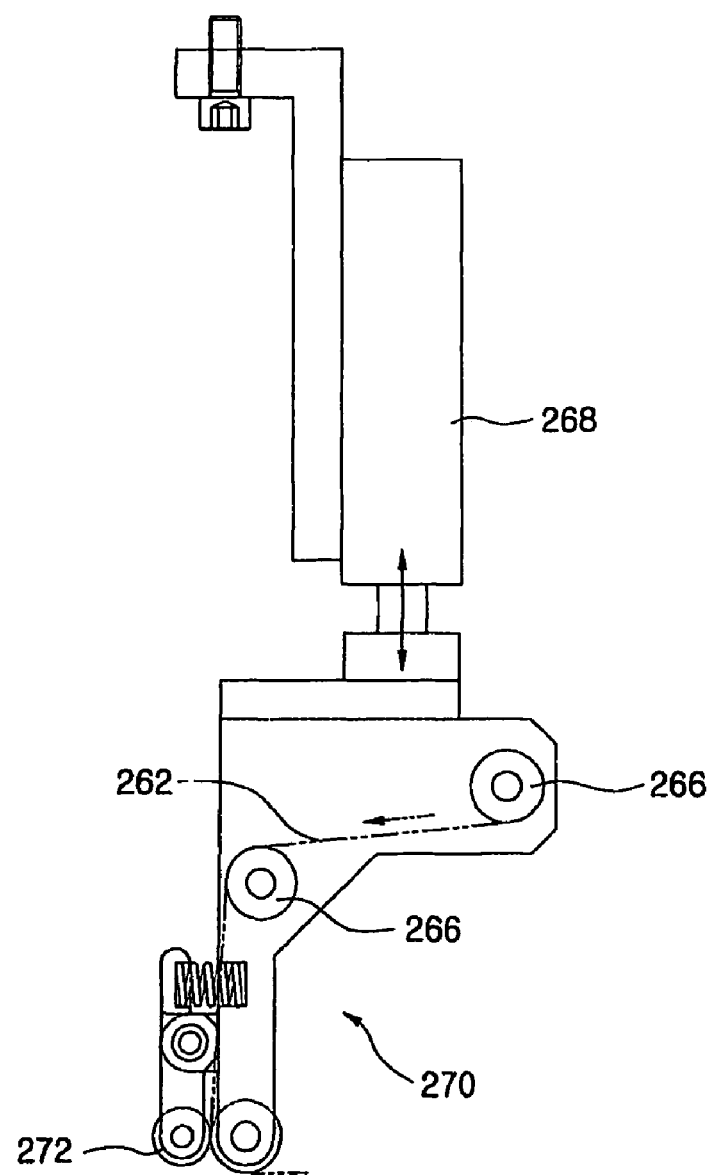
FIGS. 8A and 8B are front and right side views of a tape supplying member portion shown in FIG. 3.
Figure 8B:
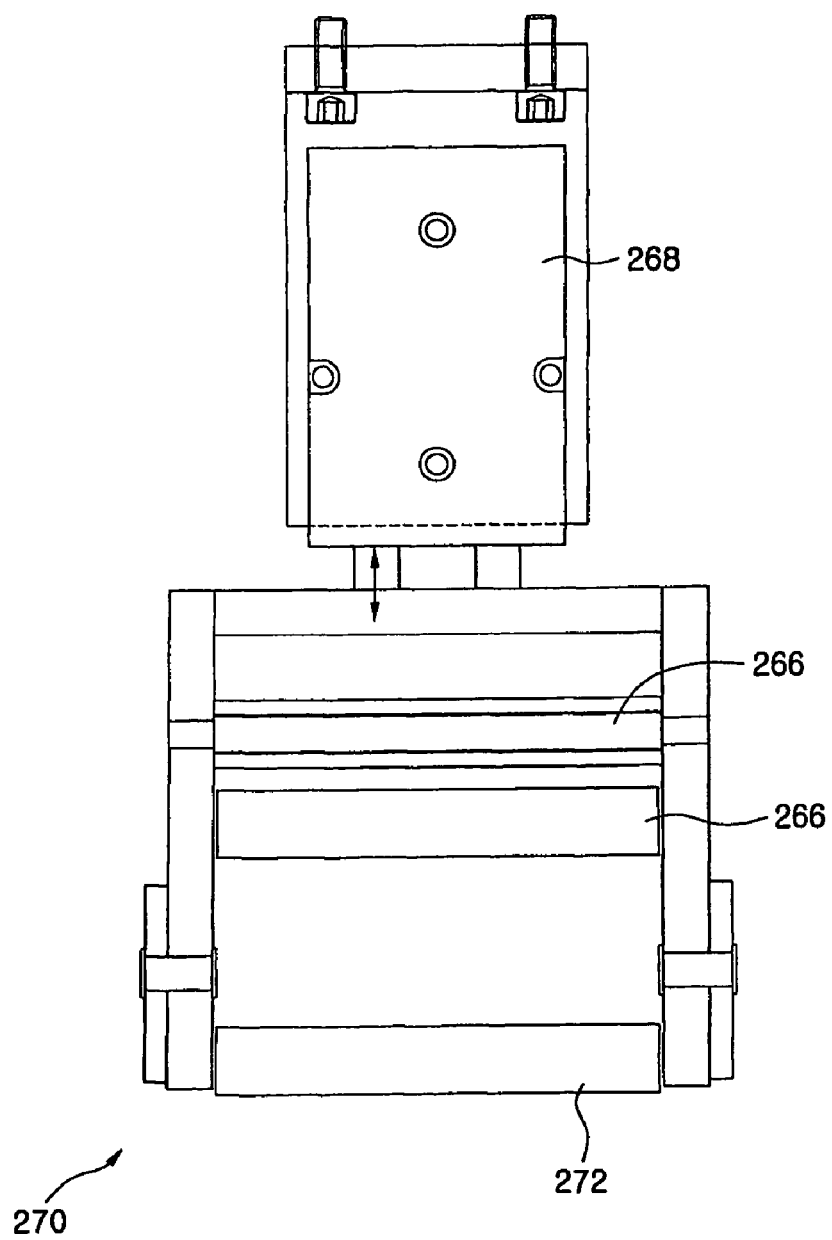

As shown in FIGS. 7A and 8B, the cutting member 250 is intended to cut the leading end of a non-attached area of the piece of separator 311 moved to the taping position by the clamp members 242, and comprises a heating cutter 258 which is provided with a heating wire 252. The heating cutter 258 is installed at one end of a cylinder 254 to be disposed over the travel path 313 so that the heating cutter 258 can be selectively moved toward the base member 210 by the cylinder 254 to contact the separator 311, and the heating wire 252 heated to a predetermined temperature can cut the separator 311. The cylinder 254 is supported by a bracket 252 which is installed at the frame 301.

Referring to FIG. 1 and FIGS. 8A and 8B, the tape supplying member 270 comprises a tape roller 264 and a plurality of tape guiding rollers 266 which are installed at the frame 301, and a pair of tape attaching rollers 272 which are installed at one end of a cylinder 268 installed at the frame 301 to be raised or lowered by the cylinder 268 and are positioned on the travel path of the tape 262 so that one end of the tape 262 can selectively contact the upper surface of the separator 311.

Figure 9A:
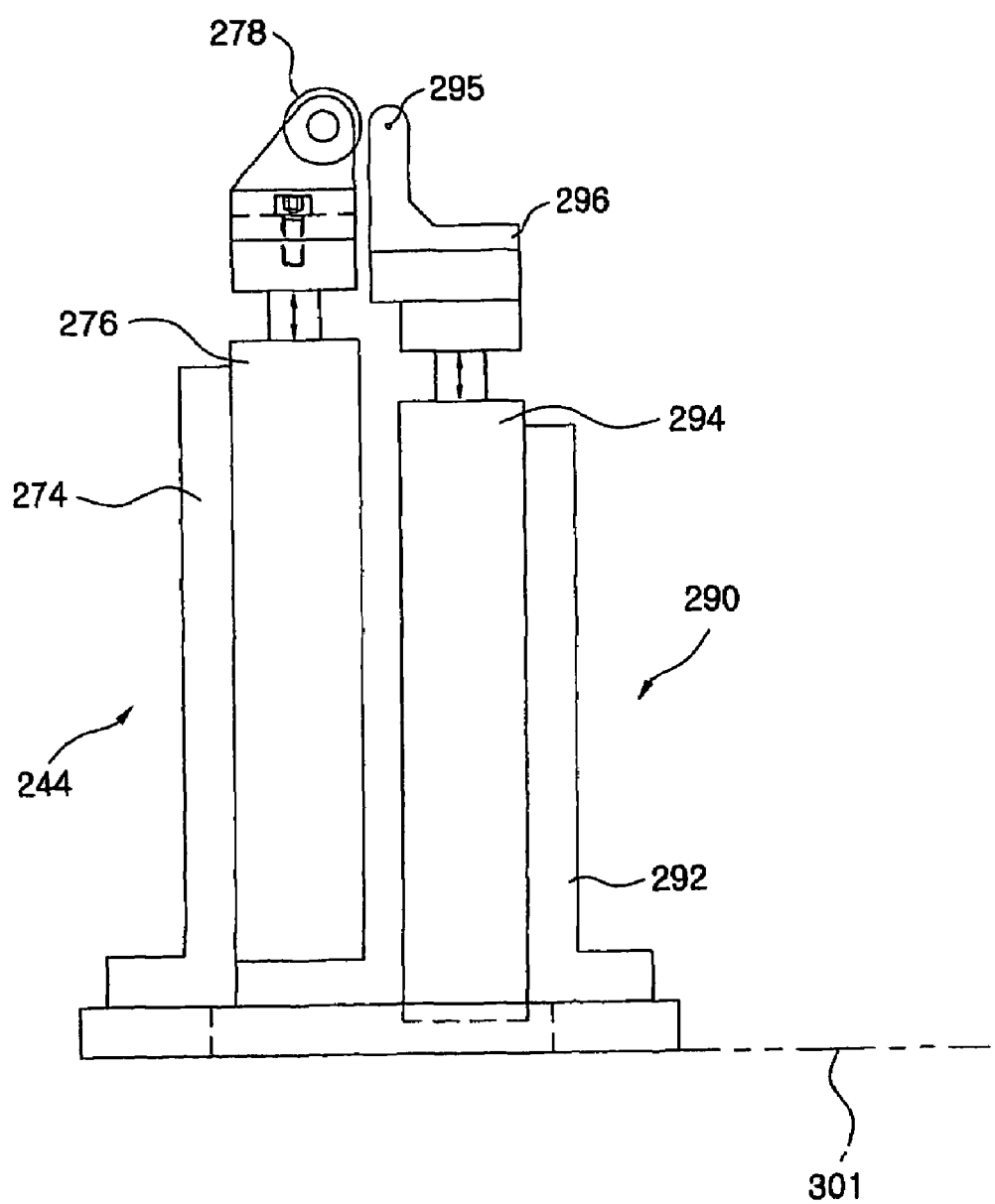
FIGS. 9A, 9B, and 9C are views of a holder member portion shown in FIG. 3.
Figure 9B:
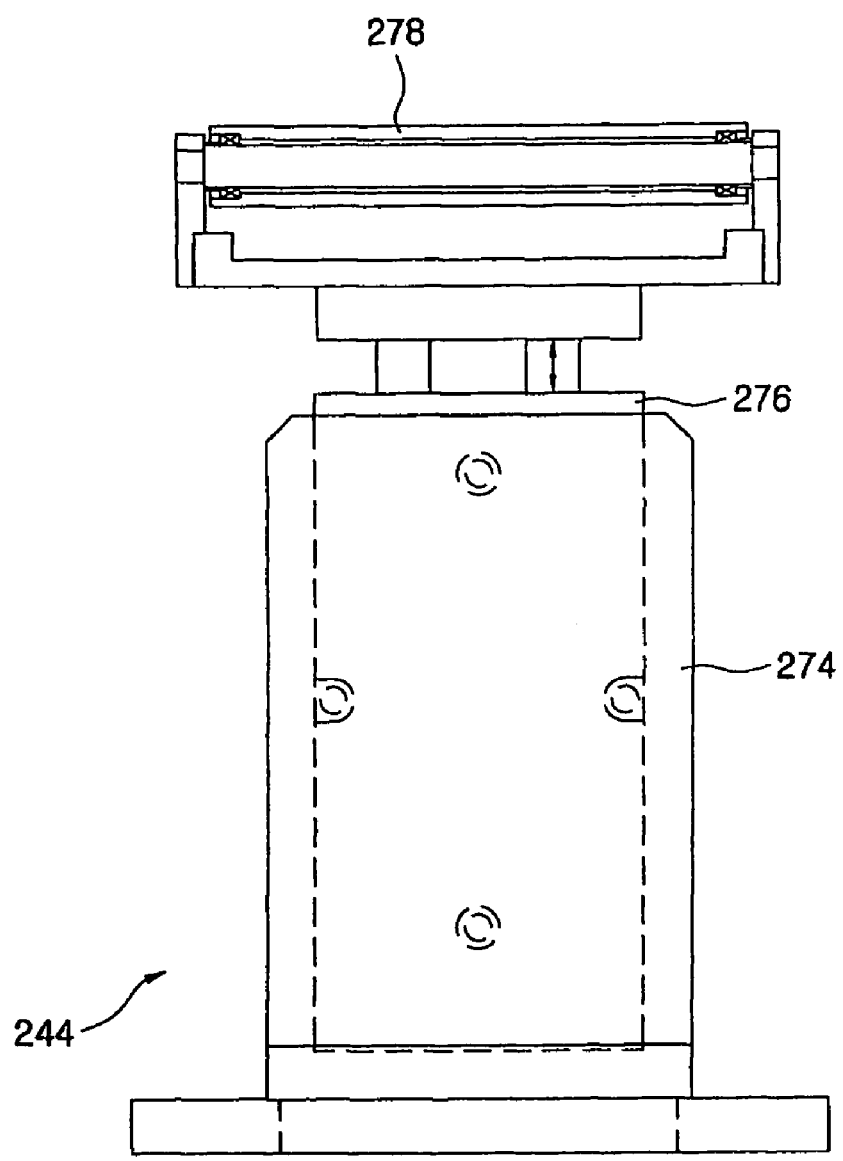

As shown in FIGS. 9A and 9B, the holder member 244 is disposed to correspond to the tape attaching rollers 272. The holder member 242 is intended to prevent a non-attached area of the separator 311 from fluttering since the separator 311 is cut before a piece of separator 311 is taped, and, therefore, the fluttering occurs. To this end, the holder member 244 comprises a bracket 274 installed at the frame 301, and a holding roller 278 installed so as to be selectively raised and lowered by a cylinder 276 installed at a bracket 274 until the holding roller 278 contact the lower surface of the separator 311.

As shown in FIGS. 6A and 6B, each of the clamp rotating members 280 comprises a stepping motor 282 installed at the movable block 241 so that the axis of rotation of the stepping motor 282 can be coaxial with that of the finger members 245, and, therefore, the clamp rotating member 280 can rotate the finger members 245 with the rotational force thereof.

Figure 9C:
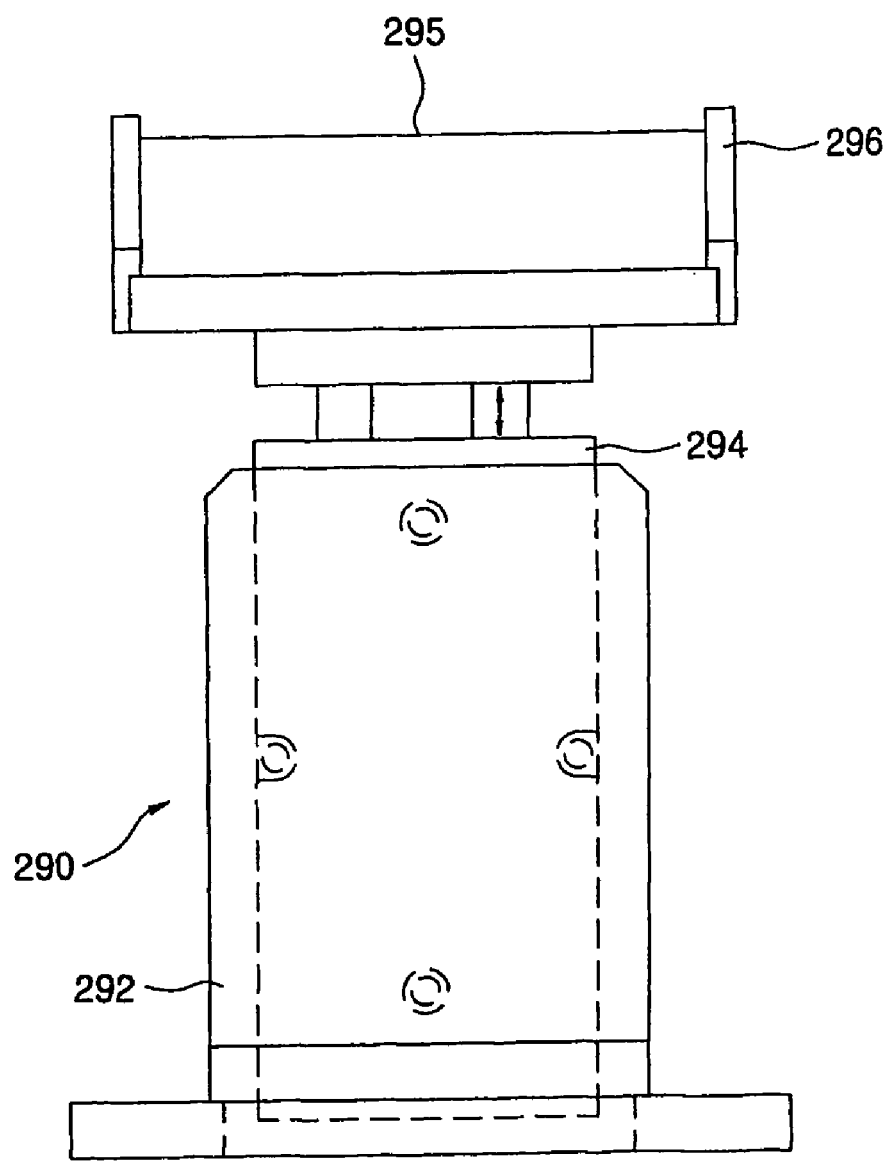

As shown in FIGS. 9A and 9C, the tape cutting member 290 is installed at the frame 301 to be close to the holder member 244 so that the tape cutting member 290 can be rotated by the clamp rotating member 280 (FIGS. 6A and 6B), and cut the loose end portion of the tape 262 (FIG. 3A) extended from the packed piece of separator 311. The tape cutting member 290 comprises a bracket 292 installed at the frame 301, and a cutting body 296 having a cutting wire 295 for heating and cutting the tape 262, which is raised and lowered by a cylinder 294 which is installed at the bracket 292 and is operated below the travel path by the control unit.

The operation of the packing apparatus for an automated manufacturing system of a lithium secondary battery configured as above according to a preferred embodiment of the present invention will be described.

First, the power of the packing apparatus 350 is turned on, and data required for the control unit is set. Then, the separator 311 both surfaces of which the positive and negative electrode plates 102 and 104 have been attached to in the predetermined pattern is prepared to be supplied via the travel path 313. In addition, the stopper member 220 is lowered to block both sides of the base member 210 and to form the receiving space 214 above the receiving rack 212.

Subsequently, when a start button of the control unit is pressed, the separator 311 which was supplied by the transporting unit begins to be supplied to the receiving rack 212 of the base member 210 guided by the guiding jaw 218. In this step, the separator 311 is biased toward the stopper member 230 by the air blowing force generated by the air nozzle 215 of the biasing member 213.

In this state, the folder plate 232 of the folder member 230 continuously presses the separator 311 supplied to the receiving space 214 and biased by a predetermined times, and folds the separator 311 so that the sections of both sides of the separator 311 can have the shape of "Z", and the positive electrode plates 102 and the negative electrode plates 104 can alternate with each other. Then, the stopper member 220 is raised in a state that the folder plate 232 presses a piece of separator 311 against the receiving rack 212. Subsequently, the clamp members 242 of the cutting/taping member 240 are caused to approach the both sides of the base member 210, and clamp both sides of the piece of separator 311 folded in the shape of "Z". Together with the clamping operation, the folder plate 232 is raised.

Thereafter, the clamp members 242 are operated to move the piece of separator 311 horizontally to a taping position. Subsequently, the tape supplying member 270 is operated to cause the leading end of the tape 262 to adhere to the upper surface of the piece of separator 311 positioned at the taping position. At the same time, the holder member 244 is raised to cause the holding roller 278 to contact the lower surface of the separator 311. Therefore, since the tape attaching rollers 272 and the holding roller 278 hold the separator 311, the separator 311 does not flutter.

Subsequently, the cutting member 250 is lowered to cut the leading end of a non-attached area of the piece of separator 311. Then, the heating cutter 258 heated to a predetermined temperature cuts the separator 311.

Thereafter, while the piece of separator 311 to which the leading end of the tape 262 is adhered is rotated at both ends thereof, the clamp rotating members 280 are operated to tape the piece of separator 311. Then, the finger members 245 are rotated by the stepping motors 282, and, at the same time, the tape 262 supplied from the tape supplying member 270 is naturally wound around the piece of separator 311 to tape the piece of separator 311.

Subsequently, the tape cutting member 290 is operated to cut the loose end of the tape 262 extended from the taped piece of separator 311. Then, the cutting wire 295 is moved to cut the tape 262 by using heat, and the packing operation is finally completed.

As described above, the packing apparatus for an automated manufacturing system of a lithium secondary battery according to the present invention has the following advantages.

First, the overall efficiency of production thereof can be enhanced due to the employment of the automated manufacturing system, and a rate of defective secondary batteries can be lowered.

Second, since the separator both surfaces of which positive electrode plates and negative electrode plates are attached to, respectively, can be folded by serialized operations of the receiving rack, the stopper member, and the pressing plate so that both side sections of the folded separator can have the shape of "Z", productivity of secondary batteries can be enhanced markedly.

Third, since folded pieces of separator can be continuously moved, and taped by automated robot equipments, productivity of secondary batteries and efficiency of manufacturing processes can be enhanced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A packing apparatus for an automated manufacturing system of a secondary lithium battery comprising:

a frame;

a base member which is installed at the frame, and is provided with a receiving rack for receiving a batch of separator both surfaces of which are laminated at predetermined intervals with positive electrode plates and negative electrode plates;

a stopper member installed at the frame to be linearly movable so as to selectively approach one end of the base member for preventing the separator being supplied to the base member from being separated from the receiving rack;

a folder member having a folder plate installed at the frame and a folder cylinder for vertically reciprocating the folder plate, the folder plate being linearly movable with respect to the receiving rack so that the folder can press the separator supplied to a receiving space formed by the receiving rack and the stopper member for predetermined duration, and fold the separator so that both side sections of the folded separator can have the shape of "Z", and the positive electrode plates and the negative electrode plates can alternate with each other; and a cutting/taping member for moving the separator folded in the shape of "Z" to a predetermined area, cutting the separator at a non-electrode area to which no electrode is attached, and the binding the circumference of the separator folded in the shape of a "Z" with a tape;

wherein, while one batch of separator is completely folded in the shape of a "Z" by the folder member, the stopper member is positioned adjacent to one end of the base member for preventing the separator from being separated from the receiving rack.

2. The packing apparatus for an automated manufacturing system of a secondary lithium battery claimed as in claim 1, wherein the base member comprises: a guiding jaw projected from a base plate to guide the separator supplied thereto; and a pair of recessed portions recessed into both sides of the receiving rack.

3. The packing apparatus for an automated manufacturing system of a secondary lithium battery claimed as in claim 1, wherein the base member further comprises a biasing member installed at the frame for biasing the separator toward the stopper member so that the separator supplied to the receiving rack can be easily folded in the shape of "Z".

4. The packing apparatus for an automated manufacturing system of a secondary lithium battery claimed as in claim 1, wherein the stopper member has a stopper fork for blocking both sides of the base member, and is linearly moved by a stopper moving member.

5. The packing apparatus for an automated manufacturing system of a secondary lithium battery claimed as in claim 1, wherein the cutting/taping member comprises: a pair of clamp members for approach both sides of the base member, clamping both sides of a piece of separator folded in the shape of "Z", and moving the piece of separator horizontally to a taping position; a cutting member installed at the frame to be movable for cutting the separator at the leading end of the base member after the separator has been moved by the clamp member; a tape supplying member installed at the frame to attach one end of tape to the piece of separator after a tape roller around which the tape is wound is moved along a tape travel path; clamp rotating members installed at the frame for rotating the clamp members predetermined times so that the piece of separator can be taped while the piece of separator to which one end of the tape is attached is rotated at both ends thereof; and a tape cutting member installed at the tape supplying member to be movable for cutting the loose end portion of the tape extended from the packed piece of separator which has been rotated by the clamp rotating members and has been packed with the tape.

6. The packing apparatus for an automated manufacturing system of a secondary lithium battery claimed as in claim 5, wherein the cutting/taping member further comprises a holder member installed at the frame to be raised and lowered so that the holder member can approach the tape supplying member and contact one surface of the separator to prevent the separator from fluttering before the separator is cut by the cutting member.

* * * * *